United States Patent Office 3,170,883
Patented Feb. 23, 1965

3,170,883
STABILIZATION OF CHLORINE IN AQUEOUS
SOLUTIONS
Robert W. Owen and Seymour Thomas, Jr., Scottsdale,
Ariz., assignors to Cortez Chemicals Company, Phoenix,
Ariz.
No Drawing. Filed Apr. 2, 1962, Ser. No. 184,590
1 Claim. (Cl. 252—187)

The present application is a continuation in part application of our co-pending application for Stabilization of Chlorine in Aqueous Solutions, Serial Number 98,323, filed March 27, 1961, and now abandoned.

This invention relates to the stabilization of chlorine or chlorine releasing chemicals as used (in use concentrated solutions) for the purpose of sanitation. This invention relates more particularly to maintenance of an effective chlorine residual in water over a longer period of time than chlorine releasing compounds will maintain by themselves, effectively decreasing the cost and increasing the efficiency of such chlorination.

The prior art use of chlorine in the form of liquified elemental chlorine under pressure, hypochlorites (sodium and calcium), and more recently, chloroisocyanurates, chlorohydantoins, and other organic chlorine releasing compounds in water conditioning for swimming pools, cooling towers, sewage disposal plants, and other water treating and purification operations to control algae and bacteria and to purify water for slime and odor control is well known. It is also well known that because of the instability of chlorine carrying compounds and dissipation of chlorine chemicals (from elemental chlorine or chlorine carrying compounds), large excesses of chlorine, from whichever source is used, must be put into the water to maintain the residual chlorine for the proper performance of the microbial control desired. In warmer weather and in warmer water this problem becomes more acute. It should be noted that the isocyanurates and other organic chlorine carrying compounds, which are much more expensive than others mentioned, provide chlorine in a more stable form than elemental chlorine or the commonly used sodium and calcium hypochlorites.

Prior art teaches the stabilization of chlorine solutions with sulfamic acid and sulfamate in substantially high concentrations, as for example, 80 parts per million of sulfamate being used recommended and chlorine, in a range of 6 to 8 parts per million, total available chlorine; such being the recommendation for satisfactory results. Accordingly, it is an object of the present invention to provide stabilization of chlorine solutions with the sulfamate ion in concentrations as low as .4 part per million with total available chlorine sufficient to give a free available chlorine in a lethal range of .2 part per million and more. This may vary according to the amount of the sulfamate ion and other conditions in the water.

Another object of the invention is to provide effective combinations of the sulfamate ion and chlorine in low percentage ranges which may be very economical for use in cooling towers where substantial amounts of water may be bled off in order to alleviate an increase of mineral contents or concentrations in the recirculated water.

Another object of the invention is to provide a very economical and effective range of sulfamate and chlorine concentrations in water, particularly adapted for use in cooling tower operations.

Another object of the invention is to provide a combination of sulfamate and chlorine in small percentage of ranges which is effective in the normal maintenance of cooling towers and which also causes a minimum amount of metal corrosion and delignification of redwood structures in such cooling towers.

Another object of the invention is to provide a combination of sulfamate and chlorine in small concentrations whereby delignification and corrosiveness is reduced as a result of reduced oxidative activities of the concentration of chlorine in the solution.

In general, all of the materials used to supply chlorine for water purication react to form the hypochlorite ion ($OCl^-$) first, and then, as hereinafter set forth, the hypochlorite ion oxidizes the contaminant.

The reactions illustrating the manner in which this takes place for two of the materials frequently used follow:

(1)

$$Cl_2 + H_2O \longrightarrow HOCl + HCl$$

Chlorine  Water  Hypochlorous  Hydrochloric
                  Acid          Acid (2)

$$C_3N_3O_3Cl_3 + 3H_2O \rightleftharpoons C_3N_3O_3H_3 + 3HOCl$$

Trichloroisocyanuric  Water  Isocyanuric  Hypochlorous
Acid                         Acid         Acid The water in which these materials are used normally contains calcium bicarbonate ($Ca(HCO_3)_2$), magnesium bicarbonate ($Mg(HCO_3)_2$), and sodium bicarbonate ($NaHCO_3$). The hypochlorous and hydrochloric acids react with these alkaline salts to form the respective hypochlorites and chlorides, as exemplified by the following equations:

(3)

$$Ca(HCO_3)_2 + 2HOCl \longrightarrow Ca(OCl)_2 + 2H_2O + 2CO_2$$

Calcium        Hypochlorous    Calcium        Water   Carbon
Bicarbonate    Acid            Hypochlorite           Dioxide (4)

$$Ca(HCO_3)_2 + 2HCl \longrightarrow CaCl_2 + 2H_2O + 2CO_2$$

Calcium        Hydrochloric    Calcium        Water   Carbon
Bicarbonate    Acid            Chloride               Dioxide (5)

$$Mg(HCO_3)_2 + 2HOCl \longrightarrow Mg(HCl)_2 + 2H_2O + 2CO_2$$

Magnesium      Hypochlorous    Magnesium      Water   Carbon
Bicarbonate    Acid            Hypochlorite           Dioxide In all cases illustrated, the actual material available for use in the functions desired is a hypochlorite.

It is commonly thought that, the hypochlorites decompose to form oxygen and chlorides. The oxygen being in the nascent form then oxidizes the contaminant making it innocuous.

(6)

$$NaOCl \longrightarrow NaCl + O$$

Sodium         Sodium    Nascent
Hypo-          Chloride  Oxygen
chlorite

In this reaction, the chlorine atom is reduced from a valence of $+1$ to a valence of $-1$, thus giving a transfer of 2 electrons per chlorine atom. Because of this, each chlorine atom in a hypochlorite is considered to be equivalent to two chlorine atoms in reactivity, and consequently when the term "Available chlorine" is used, it is a measure of the reactivity rather than the actual amount of chlorine present.

The reaction in (6) occurs spontaneously, thus illustrating the inherent instability of hypochlorites.

Di and trivalent transition group metal ions of metals such as iron, copper, and nickel are particularly effective catalysts for increasing the rate of the foregoing reaction (6). In addition, radiant energy such as ultraviolet light contained in sunlight also increases the rate of this reacton. It is for these reasons that chlorine chemicals are used in large excess of the amount actually required to provide the sanitizing action of oxidation of the unsanitary material.

Accordingly, it is an object of the invention to decrease the rate of this reaction in such a manner that there will be an effective residual of "available chlorine" for the sanitizing functions of the nascent oxygen as developed in the foregoing Equation 6, maintained over a longer period of time. In this way, the cost of maintaining water in a sanitary condition is decreased, and there is less opportunity for the available chlorine content to be decreased to an ineffective level.

The exact action by which this stabilization takes place is not known. However, it is presumed from the experimental evidence that some reversible reaction between the sulfamate and the hypochlorite takes place, which proceeds at a rate which is satisfactory for maintaining sufficient supply of nascent oxygen, as measured by the supply of available chlorine, to render the contaminant innocuous.

In the following examples of the performance of the sulfamate ion ($SO_3NH_2^-$) for the stabilization of hypochlorite ion, the sulfamate ion was obtained from neutral sodium sulfamate ($NaSO_3NH_2$). The sodium sulfamate was prepared by reacting sodium carbonate ($Na_2CO_3$—soda ash) or sodium hydroxide (NaOH—caustic soda) with sulfamic acid ($HSO_3NH_2$) in stoichiometric quantities according to the following quotations:

(7)
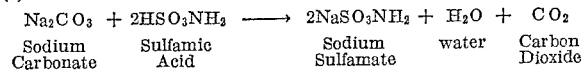
$$Na_2CO_3 + 2HSO_3NH_2 \longrightarrow 2NaSO_3NH_2 + H_2O + CO_2$$
Sodium Carbonate — Sulfamic Acid — Sodium Sulfamate — water — Carbon Dioxide (8)
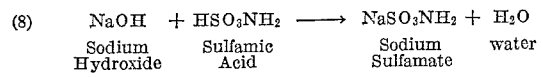
$$NaOH + HSO_3NH_2 \longrightarrow NaSO_3NH_2 + H_2O$$
Sodium Hydroxide — Sulfamic Acid — Sodium Sulfamate — water The reaction with sodium carbonate is preferred, with or without the addition of a suitable amount of a defoamer, as for example, a silicone type, since the evolution of carbon dioxide makes the reaction self-cooling, thereby avoiding any hydrolysis of the sulfamate which may be promoted by heat. Although these examples use sodium sulfamate and others use sulfamic acid, it is not to be inferred that other salts of sulfamic acid, such as calcium or magnesium sulfamates, which are inferior in that they add unwanted hardness ions, or any others, for example, potassium and lithium sulfamates, which may be deduced from the data herein, are to be avoided or considered inoperative. The resulting solutions will of course contain the respective cations, i.e., sodium, calcium, magnesium, potassium or lithium, associated with all the various anions in solution, e.g., sulfamate, hypochlorite, chloride, etc.

Example 1

In this exmple the effectiveness of the sulfamate ion in the range of 10 to 150 p.p.m. is demonstrated for mild conditions at a low level of chlorine concentration.

Six solutions, each containing 0.3 p.p.m. available chlorine from sodium hypochlorite, as measured by the standard o-tolidine test for available chlorine, and 0, 10, 50, 100, 150, and 200 p.p.m. sulfamate ion were prepared. These solutions were allowed to stand at room temperature (about 25° C.) and new measurements of available chlorine were made at intervals. It was found, during the investigation of this stabilization phenomenon, that a part of the chlorine was held in such a manner that it was not useful in microbial control, but was measurable as available chlorine by the standard o-tolidine test. It was found that by adding a small quantity of sodium arsenite solution within 10 seconds of the addition of o-tolidine solution, that the useful available (free chlorine) chlorine could be measured. These differences are noted as "Total Chlorine" as measured by the unmodified o-tolidine chlorine test for the total available chlorine and as "Free Chlorine" for the useful available chlorine as measured by the modified o-tolidine test.

| Time | Initial | | 1 day | | 2 days | | 4 days | |
|---|---|---|---|---|---|---|---|---|
| Sulfamate, p.p.m. | Parts per million | | | | | | | |
| | TC | FC | TC | FC | TC | FC | TC | FC |
| 0 | 0.3 | 0.3 | Tr | Tr | Tr | Tr | ST | ST |
| 10 | 0.3 | 0.1 | 0.3 | 0.1 | 0.2 | 0.1 | 0.1 | 0.1 |
| 50 | 0.3 | 0.1 | 0.3 | 0.1 | 0.3 | 0.1 | 0.1 | 0.1 |
| 100 | 0.3 | 0.1 | 0.3 | 0.1 | 0.3 | 0.1 | 0.1 | 0.1 |
| 150 | 0.3 | 0.1 | 0.3 | 0.1 | 0.2 | 0.1 | 0.1 | 0.1 |
| 200 | 0.3 | 0.1 | 0.3 | 0.1 | 0.1 | 0.1 | Tr | Tr |

P.p.m.=Parts per million. TC=Total chlorine. FC=Free chlorine. Tr=Trace. ST=Slight trace.

Example 2

In this example the conditions for Example 1 were duplicated except that the initial chlorine content was 0.7 p.p.m. and the test was conducted for a 7 day period. The effectiveness of sulfamate ion in stabilizing chlorine solutions is again demonstrated under mild conditions. The decreased effectiveness as the sulfamate ion exceeds 150 p.p.m. (parts per million) is also demonstrated. Results of the test conducted at about 25° C. were as follows:

| Time | Initial | | 1 day | | 2 days | | 4 days | | 7 days | |
|---|---|---|---|---|---|---|---|---|---|---|
| Sulfamate, p.p.m. | Parts per million | | | | | | | | | |
| | TC | FC | TC | FC | TC | FC | TC | FC | TC | FC |
| 0 | 0.7 | 0.6 | 0.3 | 0.3 | Tr | Tr | ST | ST | ST | ST |
| 10 | 0.7 | 0.3 | 0.6 | 0.3 | 0.6 | 0.3 | 0.5 | 0.3 | 0.4 | 0.2+ |
| 50 | 0.7 | 0.3 | 0.6 | 0.3 | 0.6 | 0.3 | 0.5 | 0.3 | 0.4 | 0.2+ |
| 150 | 0.7 | 0.3 | 0.6 | 0.3 | 0.6 | 0.3 | 0.5 | 0.3 | 0.3 | 0.2 |
| 200 | 0.7 | 0.3 | 0.6 | 0.3 | 0.5 | 0.2 | 0.4 | 0.2+ | 0.2+ | 0.1 |
| 250 | 0.7 | 0.3 | 0.6 | 0.3 | 0.5 | 0.2+ | 0.4 | 0.2 | 0.2+ | 0.1 |

Example 3

In this example the initial available chlorine was raised to 1.0 p.p.m. and the solution maintained at approximately 25° C., as in Example 2. This is another illustration of the effectiveness of the sulfamate ion.

| Time | Initial | | 1 day | | 2 days | | 4 days | | 7 days | |
|---|---|---|---|---|---|---|---|---|---|---|
| Sulfamate, p.p.m. | Parts per million | | | | | | | | | |
| | TC | FC | TC | FC | TC | FC | TC | FC | TC | FC |
| 0 | 1.0 | 0.8 | 0.5 | 0.5 | 0.1 | <0.1 | <0.1 | Tr | Tr | ST |
| 10 | 1.0 | 0.5 | 1.0 | 0.5 | 0.9 | 0.4 | 0.7 | 0.3 | 0.3 | 0.2+ |
| 50 | 1.0 | 0.5 | 1.0 | 0.5 | 0.9 | 0.4 | 0.7 | 0.3 | 0.6 | 0.3 |
| 100 | 1.0 | 0.5 | 1.0 | 0.5 | 0.9 | 0.4 | 0.7 | 0.3 | 0.6 | 0.2+ |
| 150 | 1.0 | 0.5 | 0.9 | 0.3 | 0.8 | 0.3 | 0.7 | 0.3 | 0.5 | 0.2+ |
| 200 | 1.0 | 0.5 | 0.9 | 0.3 | 0.8 | 0.3 | 0.7 | 0.3 | 0.5 | 0.2+ |

Example 4

The sulfamate ion also stabilizes the hypochlorite formed when liquified elemental chlorine is used as the source of water chlorination. This example, in which liquified elemental chlorine under pressure was used as the chlorine source, illustrates this. The initial available chlorine was 1.0 p.p.m. Temperature of the solutions during the test period was 40° C. (104° F.).

| Time | Initial | | 1 day | | 2 days | | 4 days | | 7 days | | 9 days | |
|---|---|---|---|---|---|---|---|---|---|---|---|---|
| Sulfamate, p.p.m. | Parts per million | | | | | | | | | | | |
| | TC | FC | TC | FC | TC | FC | TC | FC | TC | FC | TC | FC |
| 0 | 1.0 | 1.0 | 0.3 | 0.3 | Tr | Tr | nil | nil | nil | nil | nil | nil |
| 100 | 1.0 | 0.5 | 0.9 | 0.5 | 0.9 | 0.4 | 0.7 | 0.3 | 0.7 | 0.3 | 0.5 | 0.3 |

Example 5

This example illustrates the effectiveness of the sulfamate ion for chlorine stabilization where calcium hypochlorite is used as the source of chlorine. Calcium hypochlorite is readily obtainable in a 70% available chlorine grade, which is one of the least expensive sources of chlorine, and for many used, the most convenient. Initial available chlorine in this case was 1.0 p.p.m. and temperature was held at 40° C. (104° F.) over the period of the test.

| Time | Initial | | 1 day | | 2 days | | 4 days | | 7 days | | 9 days | |
|---|---|---|---|---|---|---|---|---|---|---|---|---|
| Sulfamate, p.p.m. | Parts per million | | | | | | | | | | | |
| | TC | FC | TC | FC | TC | FC | TC | FC | TC | FC | TC | FC |
| 0 | 1.0 | 1.0 | 0.3 | 0.3 | Tr | Tr | nil | nil | nil | nil | nil | nil |
| 100 | 1.0 | 0.5 | 0.9 | 0.5 | 0.9 | 0.3 | 0.7 | 0.3 | 0.7 | 0.3 | 0.7 | 0.2 |

The invention, as used in chlorination of water and as used in cooling towers, includes substantially lower concentrations of chlorine and the sulfamate ion as disclosed in the following examples of laboratory tests conducted similarly to the preceding examples, and at temperatures of 40° C. or 104° F.

The lower concentrations of chlorine and the sulfamate ion are, according to the invention, a particular economic advantage.

Such economy provided by the present invention is apparent from its use in the operation and maintenance of cooling towers.

Example 6

| Time | Initial | | | 4½ hrs. | | | 7.0 hrs. | | | 23½ hrs. | | | 30 hrs. | | | 47½ hrs. | | | 42½ hrs. | | |
|---|---|---|---|---|---|---|---|---|---|---|---|---|---|---|---|---|---|---|---|---|---|
| Sulfamate, p.p.m. | Parts per million | | pH | Parts per million | | pH | Parts per million | | pH | Parts per million | | pH | Parts per million | | pH | Parts per million | | pH | Parts per million | | pH |
| | TC | FC | | TC | FC | | TC | FC | | TC | FC | | TC | FC | | TC | FC | | TC | FC | |
| 1 | 6.4 | 2.0 | 7.90 | 5.6 | 1.2 | | 4.0 | 0.8 | 7.95 | 1.2 | 0.4 | 8.25 | 0.8 | 0.2 | 8.15 | 0 | 0 | 8.70 | | | |
| 2 | 6.4 | 2.0 | 7.90 | 8.0 | 1.2 | | 4.0 | 0.8 | 8.05 | 1.6 | 0.4 | 8.35 | 1.2 | 0.4 | 8.25 | 0.6 | 0.2 | 8.70 | 0.3 | 0.1 | |
| 4 | 8.0 | 2.4 | 8.00 | 8.0 | 1.2 | | 6.4 | 1.2 | 8.00 | 3.2 | 0.8 | 8.40 | 3.2 | 0.8 | 8.25 | 1.4 | 0.8 | 8.90 | 0.8 | 0.4 | |
| 6 | 8.0 | 2.4 | 7.95 | 8.0 | 1.2 | | 6.4 | 1.2 | 8.15 | 4.0 | 1.0 | 8.45 | 3.2 | 1.0 | 8.25 | 2.0 | 1.2 | 8.70 | 1.6 | 0.6 | |
| 8 | 8.0 | 2.0 | 7.95 | 8.0 | 1.2 | | 6.4 | 1.2 | 8.25 | 6.4 | 1.2 | 8.35 | 6.4 | 1.2 | 8.25 | 3.2 | 0.8 | 8.60 | 2.4 | 0.8 | |

| Time | 71½ hrs. | | | 76½ hrs. | | | 79½ hrs. | | | 95½ hrs. | | | 100½ hrs. | | | 103½ hrs. | | | 119½ hrs. | | |
|---|---|---|---|---|---|---|---|---|---|---|---|---|---|---|---|---|---|---|---|---|---|
| Sulfamate, p.p.m. | Parts per million | | pH | Parts per million | | pH | Parts per million | | pH | Parts per million | | pH | Parts per million | | pH | Parts per million | | pH | Parts per million | | pH |
| | TC | FC | | TC | FC | | TC | FC | | TC | FC | | TC | FC | | TC | FC | | TC | FC | |
| 1 | | | | | | | | | | | | | | | | | | | | | |
| 2 | 0 | 0 | 8.70 | | | | | | | | | | | | | | | | | | |
| 4 | 0.6 | 0.3 | 8.65 | 0.6 | 0.3 | 8.45 | 0.6 | 0.3 | 8.50 | 0.4 | 0.2 | 8.50 | 0.3 | 0.1 | 8.55 | 0.3 | 0.1 | 8.55 | 0.2 | 0.1 | 8.60 |
| 6 | 1.2 | 0.5 | 8.75 | 1.0 | 0.4 | 8.45 | 1.0 | 0.4 | 8.60 | 0.6 | 0.3 | 8.60 | 0.6 | 0.3 | 8.60 | 0.5 | 0.3 | 8.60 | 0.3 | 0.1 | 8.60 |
| 8 | 1.6 | 0.6 | 8.75 | 1.6 | 0.6 | 8.50 | 1.6 | 0.6 | 8.60 | 1.2 | 0.5 | 8.60 | 1.2 | 0.5 | 8.55 | 1.2 | 0.5 | 8.60 | 0.6 | 0.4 | 8.60 |

| Time | 127½ hrs. | | | 143½ hrs. | | | 148½ hrs. | | | 151½ hrs. | | | 168½ hrs. | | |
|---|---|---|---|---|---|---|---|---|---|---|---|---|---|---|---|
| Sulfamate, p.p.m. | Parts per million | | pH | Parts per million | | pH | Parts per million | | pH | Parts per million | | pH | Parts per million | | pH |
| | TC | FC | | TC | FC | | TC | FC | | TC | FC | | TC | FC | |
| 1 | | | | | | | | | | | | | | | |
| 2 | | | | | | | | | | | | | | | |
| 4 | 0 | 0 | 8.60 | | | | | | | | | | | | |
| 6 | 0.3 | 0.1 | 8.65 | 0.1 | 0 | 8.60 | 0.1 | 0 | 8.60 | 0 | 0 | 8.60 | | | |
| 8 | 0.6 | 0.3 | 8.60 | 0.6 | 0.3 | 8.65 | 0.6 | 0.3 | 8.65 | 0.5 | 0.2 | 8.65 | 0 | 0 | 8.50 |

*Example 7*

| Time | Initial—After Reducing to 7.0±pH | | | 17 Hours—After reducing to 7.0±pH | | | 24½ Hours—After reducing to 7.0±pH | | | 41 Hours—After reducing to 7.0±pH | | |
|---|---|---|---|---|---|---|---|---|---|---|---|---|
| Sulfamate, p.p.m. | Parts per million | | pH | Parts per million | | pH | Parts per million | | pH | Parts per million | | pH |
| | TC | FC | | TC | FC | | TC | FC | | TC | FC | |
| 0 | | | 7.85 | 2.4 | 0.8 | 6.9 | 0.3 | 0 | 7.65 | 0.2 | 0 | 7.5 |
| .1 | | | 7.85 | 2.4 | 0.8 | 6.9 | 0.2 | 0 | 8.00 | 0.1 | Tr | 7.10 |
| .4 | | | 7.85 | 2.4 | 0.8 | 6.9 | 0.2 | 0.1 | 7.75 | 0.2 | 0.1 | 7.15 |
| .8 | | | 7.85 | 2.4 | 0.8 | 6.9 | 0.2 | 0.1 | 8.05 | 0.2 | 0.1 | 7.15 |
| 1.0 | | | 7.85 | 2.4 | 0.8 | 6.9 | 0.5 | 0.2 | 7.55 | 0.5 | 0.2 | 7.5 |

| Sulfamate, p.p.m. | 24½ Hrs (cont.) | | | 41 Hrs (cont.) | | | | | | | | |
|---|---|---|---|---|---|---|---|---|---|---|---|---|
| | TC | FC | pH | TC | FC | pH | TC | FC | pH | TC | FC | pH |
| 0 | 0 | 0 | 7.50 | | | | | | | | | |
| .1 | 0 | 0 | 7.50 | | | | | | | | | |
| .4 | 0.1 | 0 | 7.55 | 0.1 | Tr | 7.15 | | | | | | |
| .8 | 0.2 | 0 | 7.50 | 0.2 | Tr | 7.15 | 0 | 0 | 7.80 | | | |
| 1.0 | 0.4 | 0.2 | 7.40 | 0.4 | 0.2 | 7.20 | 0.1 | 0 | 7.70 | 0.1 | Tr | 7.10 |
| | | | | | | | 0.3 | 0.1 | 7.60 | 0.3 | 0.1 | 7.20 |

| Time | 48½ Hours—After Reducing to 7.0±pH | | | 65 Hours—After Reducing to 7.0±pH | | | 72½ Hours—After Reducing to 7.0±pH | | |
|---|---|---|---|---|---|---|---|---|---|
| Sulfamate, p.p.m. | Parts per million | | pH | Parts per million | | pH | Parts per million | | pH |
| | TC | FC | | TC | FC | | TC | FC | |
| .1 | | | | | | | | | |
| .4 | | | | | | | | | |
| .8 | 0 | 0 | 7.35 | | | | | | |
| 1.0 | 0.3 | 0.1 | 7.45 | 0.3 | 0.1 | 7.00 | 0.2 | 0.1 | 7.60 |
| | | | | 0.2 | 0.1 | 7.00 | 0 | 0 | 8.40 |

Previous knowledge of the art of stabilizing chlorine solutions with sulfamic acid and sulfamate all indicates that both high concentrations of sulfamate (80 p.p.m. sulfamate are usually recommended) and chlorine (6–8 p.p.m. total available chlorine) are required for satisfactory results.

The data in Examples 6 and 7 demonstrate that effective quantities of sulfamate ion may be as low as 0.4 p.p.m. with total available chloride sufficient to give a free available chlorine in the lethal range of 0.2 p.p.m. and over. This will vary according to the amount of sulfamate ion, and other conditions of the water thus, a preferred embodiment of the invention comprises a water solution consisting essentially of water, free available chlorine in a concentration of about 0.2 to about 3.0 p.p.m. and sulfamate ions in a concentration between about 1 and 10 p.p.m. Such a solution is particularly suitable for use in a cooling system such as an evaporative water-cooling tower.

This disclosure shows that in cooling towers where it is uneconomical to use large quantities of either chlorine or sulfamate that lower concentrations are effective. In particular, Example 6 shows that, even after the total chlorine content of the samples dropped to less than 1 p.p.m., sulfamate in amounts of 1 to 8 p.p.m. remained effective for a substantial length of time to maintain the low chlorine residual effective in cooling towers. Example 7 shows that amounts of sulfamate below about 1 p.p.m. are substantially ineffective for this purpose.

In cooling towers, where considerable amounts of water are bled off in order to control concentrations of scale forming ingredients, the cost of adding the usually recommended amounts of sulfamate is prohibitive. We have found however that 4 p.p.m. sulfamate is economically feasible. The cost of the quantity of Sulfamate required to maintain this concentration is slightly over that of the cost of chlorine saved. However, the cost of downtime for cleaning accumulated algae, the cost of cleaning the towers, the increased life of redwood cooling towers and the lower corrosion rates more than offset this additional cost of materials.

The following observation have been made on sulfamate stabilized chloride solutions circulated in industrial cooling towers.

(1) Although algae and slime forming organism growths are inhibited, the delignification common to redwood towers which are chlorine treated is apparently decreased, also.

(2) Corrosive effects on metallic components of the system are decreased.

(3) Algae growth inhibition is enhanced. This appears to be due to a combination of retaining chlorine residuals over a longer period of time and the apparent synergistic action between the algaecidal properties of chlorine and sulfamate ions.

The mechanism by which delignification and corrosiveness are reduced appears to be a result of reduced oxidative activities for the concentration of chlorine in the solution. It is felt that the electrochemical oxidation potential of the hypochlorite ion, is reduced when the sulfamate ion is present.

Delignification of redwood cooling tower structures and subsequent microbial attach of the cellulosic portion of the wood, results in destruction of such structures and represents a substantial percentage of the overall operating cost of the cooling towers. Thus the invention, due to low chemical concentrations, tends to economize with respect to maintenance of such cooling towers.

It will be appreciated by those skilled in the art that when delignification of redwood progresses that the structure of the wood is then more vulnerable to microbial attack; thus, the present invention utilizes low concentrations of the sulfamate ions and chlorine and has compound advantages. Furthermore, the common tendency to use relatively greater concentrations of chlorine in in humid climatic conditions may be alleviated according to the present invention. From the foregoing, it will be apparent that the present invention not only economizes on the use of chlorine and sulfamate, but also reduces maintenance costs with respect to operation of various equipment such as cooling towers, or the like.

It will be obvious to those skilled in the art that various modifications of the present invention may be resorted to in a manner limited only by a just interpretation of the following claim.

We claim:

A water solution suitable for circulating use in a cooling system including an evaporative water-cooling tower, said solution consisting essential of water, free available chlorine in a concentration of about 0.2 to 3.0 p.p.m., and sulfamate ions in a concentration between about 1 and 10 p.p.m.

References Cited by the Examiner

UNITED STATES PATENTS

| | | | |
|---|---|---|---|
| 2,427,097 | 9/47 | Kamlet et al. | 252—187 XR |
| 2,862,790 | 12/58 | Peirce | 23—166 |
| 2,980,622 | 4/61 | Symes | 252—187 XR |
| 2,988,471 | 6/61 | Fuchs et al. | 252—187 XR |

OTHER REFERENCES

"Handbook of Industrial Water Conditioning," 5th Edition, Betz Lab. Inc., pages 178–181.

"Active Chlorine Compounds—Their Chemistry and Application," Chenicek, Textile Research Journal, vol. 16, pages 219–225, May 1946.

ALBERT T. MEYERS, *Primary Examiner.*

JULIUS GREENWALD, *Examiner.*